(12) United States Patent
Kim et al.

(10) Patent No.: US 7,995,847 B2
(45) Date of Patent: *Aug. 9, 2011

(54) APPARATUS AND METHOD FOR ENCODING AND DECODING IMAGE DATA WITH SELECTED QUANTIZATION BASED ON PIXEL BIT DEPTH

(75) Inventors: Wooshik Kim, Yongin-si (KR); Hyun Mun Kim, Seongnam-si (KR); Daesung Cho, Seoul (KR); Dmitri Birinov, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1265 days.

This patent is subject to a terminal disclaimer.

(21) Appl. No.: 11/482,036

(22) Filed: Jul. 7, 2006

(65) Prior Publication Data

US 2007/0014481 A1 Jan. 18, 2007

(30) Foreign Application Priority Data

Jul. 12, 2005 (KR) ........................ 10-2005-0062933

(51) Int. Cl.
*G06K 9/36* (2006.01)

(52) U.S. Cl. ........ 382/232; 382/239; 382/246; 382/251; 375/240; 375/240.02; 375/240.03; 375/240.12; 375/240.18

(58) Field of Classification Search .................. None
See application file for complete search history.

(56) References Cited

U.S. PATENT DOCUMENTS

| | | | |
|---|---|---|---|
| 5,115,309 A | 5/1992 | Hang | |
| 5,621,466 A | 4/1997 | Miyane et al. | |
| 5,638,126 A | 6/1997 | Lim | |
| 5,781,561 A | 7/1998 | Machida et al. | |
| 5,892,847 A * | 4/1999 | Johnson | 382/232 |
| 6,091,856 A * | 7/2000 | Terane et al. | 382/246 |
| 6,111,991 A | 8/2000 | Ribas-Corbera et al. | |
| 6,445,739 B1 | 9/2002 | Shen et al. | |
| 6,501,793 B2 | 12/2002 | Shen et al. | |
| 6,532,262 B1 | 3/2003 | Fukuda et al. | |
| 6,738,423 B1 * | 5/2004 | Lainema et al. | 375/240.03 |

(Continued)

FOREIGN PATENT DOCUMENTS

WO 98/35503 8/1998

(Continued)

OTHER PUBLICATIONS

Nguyen, Performance Analysis of H.263 Video Encoder for Viram, Nov. 1999, University of California at Berkeley.*

(Continued)

*Primary Examiner* — Sath V Perungavoor
*Assistant Examiner* — Jason Heidemann
(74) *Attorney, Agent, or Firm* — Staas & Halsey LLP

(57) ABSTRACT

An apparatus and method for encoding and decoding image data. The image data encoding apparatus includes: a transformer transforming pixel values of an image in a time domain into pixel values in a frequency domain; a quantization coefficient determiner determining a quantization coefficient proportional to a number of bits per pixel of the image; a quantization unit quantizing the pixel values transformed by the transformer based on the quantization coefficient determined by the quantization coefficient determiner; and an entropy encoder generating a bitstream of the quantized pixel values.

40 Claims, 4 Drawing Sheets

U.S. PATENT DOCUMENTS

| | | | |
|---|---|---|---|
| 6,865,224 B1 | 3/2005 | Knee et al. | |
| 7,010,035 B2 | 3/2006 | Shen et al. | |
| 7,295,609 B2 | 11/2007 | Sato et al. | |
| 7,492,820 B2 | 2/2009 | Puri | |
| 2003/0105788 A1* | 6/2003 | Chatterjee | 708/402 |
| 2003/0128756 A1* | 7/2003 | Oktem | 375/240.03 |
| 2005/0036699 A1* | 2/2005 | Holcomb et al. | 382/239 |
| 2005/0135694 A1* | 6/2005 | Daly | 382/254 |
| 2005/0276501 A1* | 12/2005 | Nakayama et al. | 382/251 |
| 2006/0110051 A1 | 5/2006 | Kondo et al. | |
| 2006/0257034 A1* | 11/2006 | Gish et al. | 382/239 |
| 2007/0147510 A1* | 6/2007 | Asad et al. | 375/240.18 |
| 2008/0075166 A1 | 3/2008 | Gish et al. | |
| 2008/0240235 A1* | 10/2008 | Holcomb et al. | 375/240.03 |
| 2009/0003438 A1 | 1/2009 | Kottke et al. | |

FOREIGN PATENT DOCUMENTS

| | | |
|---|---|---|
| WO | 2004/047454 | 6/2004 |

OTHER PUBLICATIONS

Barnett, Basic concepts and techniques of video coding and the H.261 standard, 2000, Handbook of Image and Video Processing, Second Edition, Chapter 6.1, pp. 777-797.*

Gish et al., "JVT-E048r1—10-bit and 12-bit Sample Depth", 2002, 5th Meeting: Geneva, CH.*

Gish et al., "Joint Video Team (JVT) of ISO/IEC MPEG & ITU-T VCEG (ISO/IEC JTC1/SC29/WG11 and ITU-T SG16 Q.6)", 2003, 8th Meeting: Geneva, Switzerland.*

U.S. Appl. No. 11/484,699, filed Jul. 12, 2006, Wookshik Kim et al., Samsung Electronics Co., LTD.

International Search Report dated and mailed on Oct. 18, 2006, and issued in International Application No. PCT/KR2006/002744.

USPTO Office Action mailed Sep. 2, 2009, issued in to case U.S. Appl. No. 11/484,699.

USPTO Office Action mailed Apr. 23, 2010, issued in to case U.S. Appl. No. 11/484,699.

USPTO Notice of Allowance mailed Aug. 5, 2010, issued in to case U.S. Appl. No. 11/484,699.

* cited by examiner

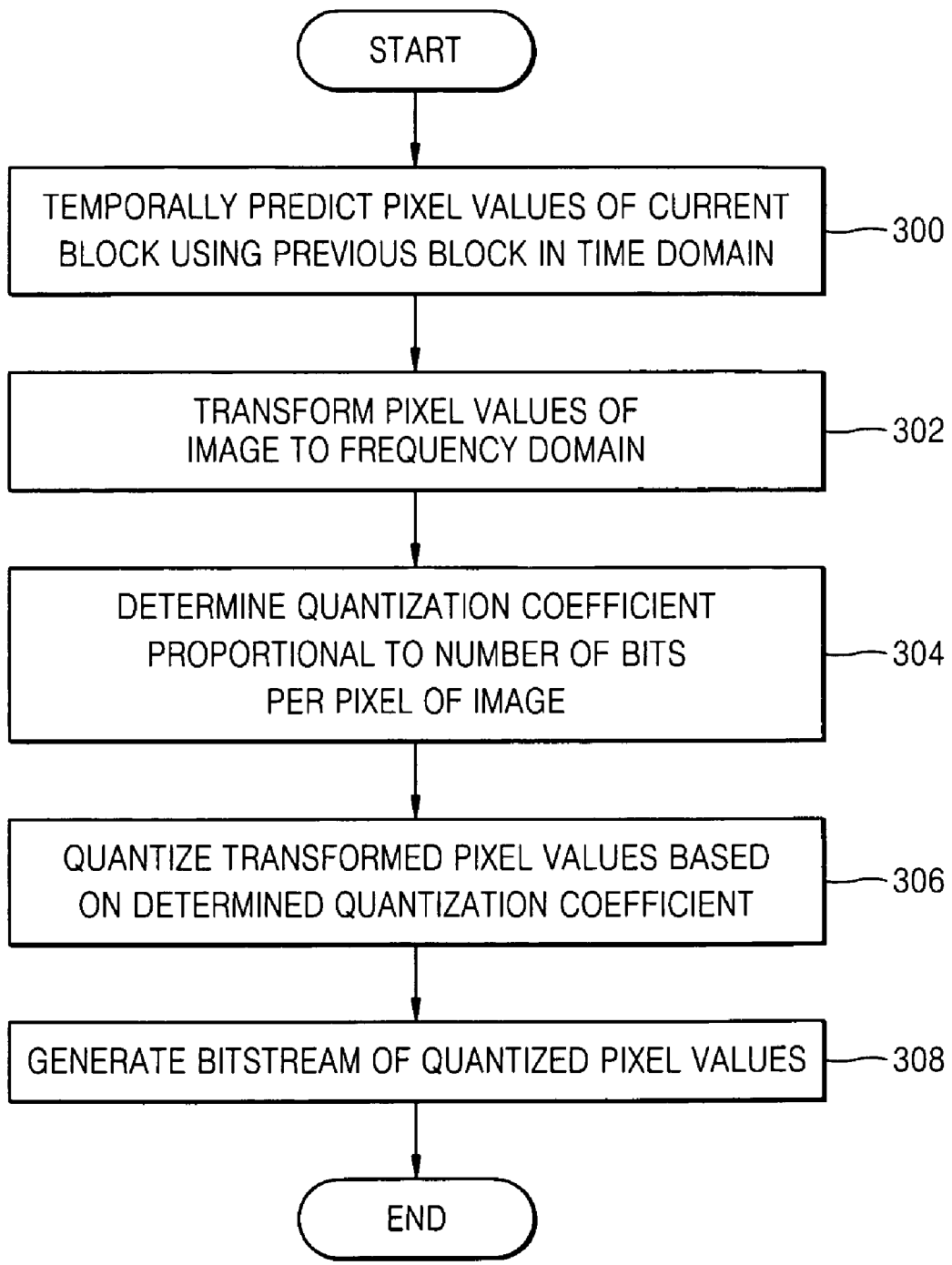

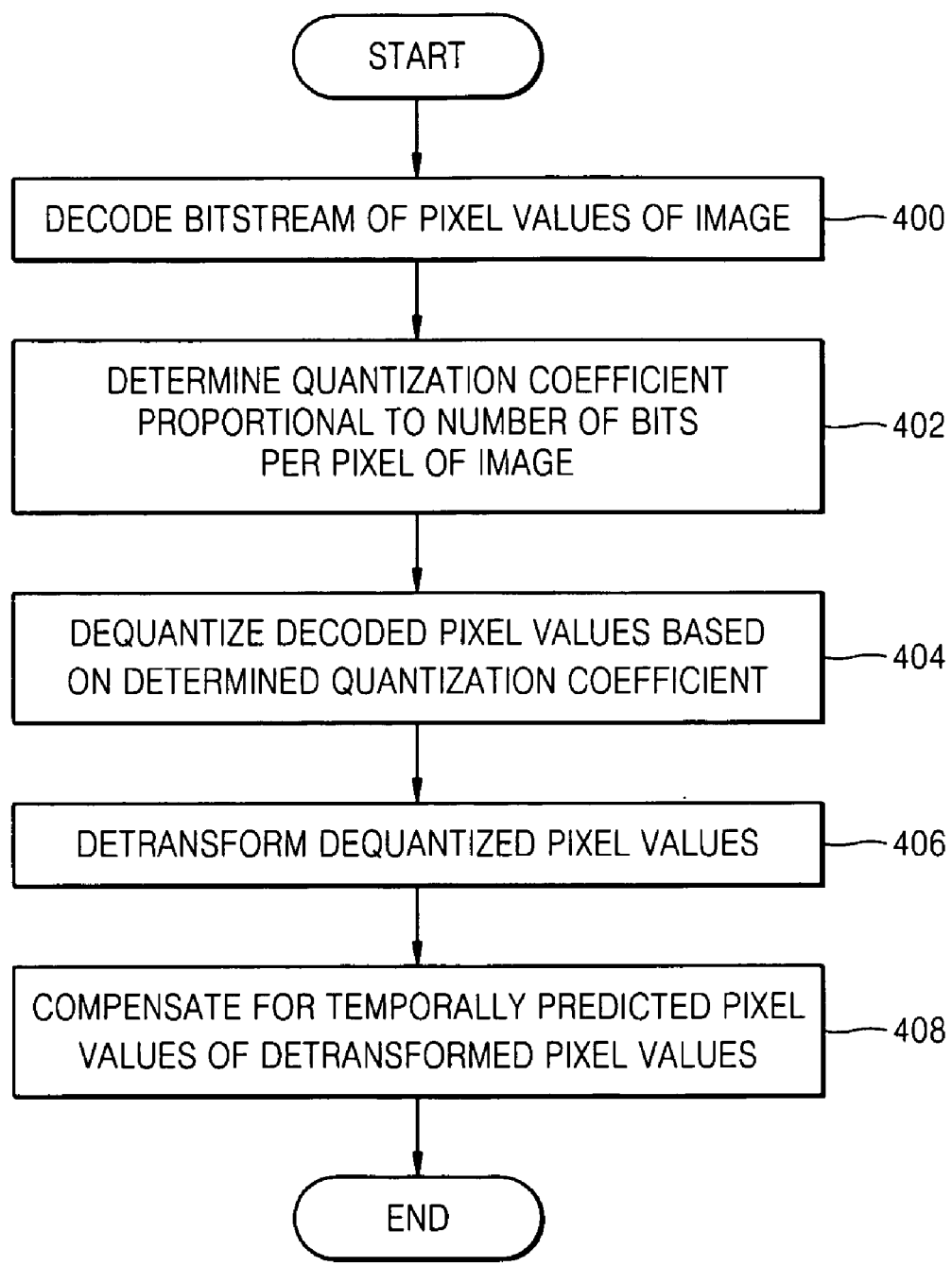

APPARATUS AND METHOD FOR ENCODING AND DECODING IMAGE DATA WITH SELECTED QUANTIZATION BASED ON PIXEL BIT DEPTH

CROSS-REFERENCE TO RELATED APPLICATION

This application claims the benefit of Korean Patent Application No. 10-2005-0062933, filed on Jul. 12, 2005, in the Korean Intellectual Property Office, the disclosure of which is incorporated herein by reference.

BACKGROUND OF THE INVENTION

1. Field of the Invention

The present invention relates to encoding and decoding of image data, and more particularly, to an apparatus and method for encoding and decoding image data through adaptive quantization according to the number of bits by determining a quantization coefficient proportional the number of bits per pixel.

2. Description of Related Art

An image acquired by a camera is displayed with an appropriate size, i.e., a number of pixels, through sampling. When the image is displayed, the number of bits required to represent a value of each pixel is determined, and to display the image with high quality, an increase of the number of representable values is required, thereby increasing the number of bits. In addition, accompanying the development of image devices, the number of bits has gradually increased. For example, although 8 bits are used in many fields, recently, 10 or 12 bits are being increasingly used in application fields where high quality images are required.

For conventional image compression, compression schemes for 8-bit images have been generally developed. For example, VC-1 (VC-1 Compressed Video Bitstream Format and Decoding Process) corresponding to a compression video codec standardized by the Society of Motion Picture and Television Engineers (SMPTE) provides effective quantization schemes suitable for every case using various kinds of image information. However, in the quantization schemes used in VC-1, the number of bits per pixel is fixed at 8. Although an 8-bit image is popularly used for image coding schemes, a limitation in the image quality exists when the 8-bit image is used. Thus, considering the gradual increase of the demands for images having high quality, it is necessary to provide a method using a quantization scheme suitable even for an image using a number of bits per pixel greater than 8.

BRIEF SUMMARY

An aspect of the present invention provides an apparatus for encoding and decoding image data to obtain a high quality image at a high compression ratio by automatically performing adaptive quantization according to the number of bits per pixel.

An aspect of the present invention also provides a method of encoding and decoding image data to obtain a high quality image at a high compression ratio by automatically performing adaptive quantization according to the number of bits per pixel.

According to an aspect of the present invention, there is provided an image data encoding apparatus including: a transformer transforming pixel values of an image in a time domain into pixel values in a frequency domain; a quantization coefficient determiner determining a quantization coefficient proportional to a number of bits per pixel of the image; a quantization unit quantizing the pixel values transformed by the transformer based on the quantization coefficient determined by the quantization coefficient determiner; and an entropy encoder generating a bitstream of the quantized pixel values.

According to another aspect of the present invention, there is provided an image data decoding apparatus including: an entropy decoder decoding a bitstream of pixel values of an image; a quantization coefficient determiner determining a quantization coefficient proportional into the number of bits per pixel of the image; a dequantization unit dequantizing the pixel values decoded by the entropy decoder based on the quantization coefficient determined by the quantization coefficient determiner; and a detransformer detransforming the pixel values dequantized by the dequantization unit.

According to another aspect of the present invention, there is provided an image data encoding method including: transforming pixel values of an image in a time domain into pixel values in a frequency domain; determining a quantization coefficient proportional to a number of bits per pixel of the image; quantizing the transformed pixel values based on the determined quantization coefficient; and generating a bitstream of the quantized pixel values.

According to another aspect of the present invention, there is provided an image data decoding method including: decoding a bitstream of pixel values of an image; determining a quantization coefficient proportional to a number of bits per pixel of the image; dequantizing the decoded pixel values based on the determined quantization coefficient; and detransforming the dequantized pixel values.

According to other aspects of the present invention, there are provided computer readable recording media storing computer readable programs for executing the aforementioned methods.

Additional and/or other aspects and advantages of the present invention will be set forth in part in the description which follows and, in part, will be obvious from the description, or may be learned by practice of the invention.

BRIEF DESCRIPTION OF THE DRAWINGS

The above and/or other aspects and advantages of the present invention will become apparent and more readily appreciated from the following detailed description, taken in conjunction with the accompanying drawings of which:

FIG. 3 is a flowchart of an image data encoding method according to an embodiment of the present invention; and FIG. 4 is a flowchart of an image data decoding method according to an embodiment of the present invention.

DETAILED DESCRIPTION OF EMBODIMENTS

Figure 1:
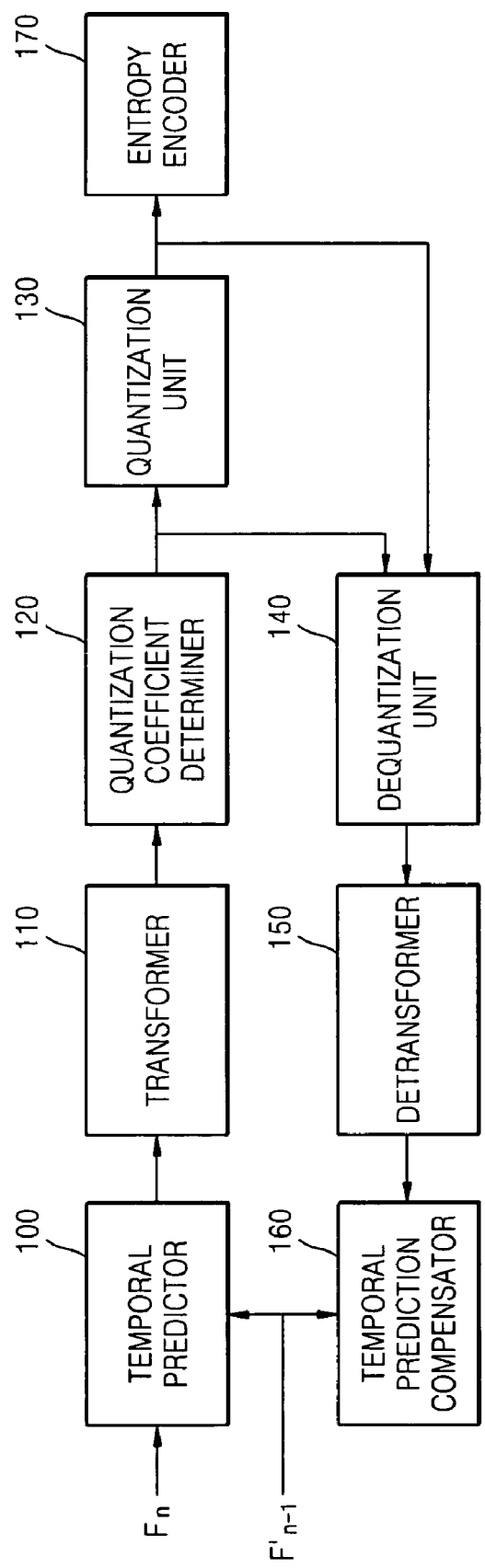
FIG. 1 is a block diagram of an image data encoding apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram of an image data encoding apparatus according to an embodiment of the present invention. Referring to FIG. 1, the image data encoding apparatus includes a temporal predictor 100, a transformer 110, a quantization coefficient determiner 120, a quantization unit 130, a dequantization unit 140, a detransformer 150, a temporal prediction compensator 160, and an entropy encoder 170.

The temporal predictor 100 temporally predicts pixel values of a current block using a previous block in the time domain and outputs the prediction result to the transformer 110.

The temporal predictor 100 predicts a current image frame $F_n$ by estimating a motion in a previous image frame $F_{n-1}'$. That is, the temporal predictor 100 searches the previous frame $F_{n-1}'$ for a block similar to a block having a predetermined size to be currently encoded and then subtracts pixel values of the previous block from pixel values of the current block. When the first frame is processed, this procedure is omitted since the previous block does not exist. Stated another way, the procedure can be omitted by a user to prevent a random access and error propagation.

The transformer 110 transforms pixel values of an image in the time domain to pixel values in a frequency domain and outputs the transform result to the quantization coefficient determiner 120. An orthogonal transform encoding method is used as the transforming method. Non-limiting examples of such orthogonal transform encoding methods include a fast Fourier transform (FFT) method, a discrete cosine transform (DCT) method, a Karhunen Loeve transform (KLT) method, an Hadamard transform method, and slant transform method.

The pixel values transformed into the frequency domain by the transformer 110 are classified into a DC component corresponding to a low frequency domain and an AC component corresponding to a high frequency domain. The DC component indicates a transformed pixel value in the low frequency domain, which corresponds to coordinates (0,0), and the AC component indicates the other pixel values.

The quantization coefficient determiner 120 determines a quantization coefficient proportional to the number of bits per pixel of the image and outputs the determination result to the quantization unit 130 and the dequantization unit 140.

A quantization process of VC-1 is limited in that the number of bits per pixel of an input image is 8. In this case, a quantization variable defined by a user has a range of [1, 31]. To make encoding possible even when the number of bits per pixel of the input image is greater than 8, a process of adapting the quantization coefficient according to the number of bits per pixel is necessary.

The current embodiment uses a method of determining the quantization coefficient proportional to N, where N denotes the number of bits per pixel of the input image. In this case, since the quantization coefficient is determined proportional to N bits, the quantization variable defined by the user is not changed regardless of the variation of an N value. The quantization coefficient adjusted according to N bits can be obtained using Equation 1.

$$QS_F = QP \times 2^{(N-8)} \quad (1)$$

That is, $QS_F$ is the quantization coefficient adjusted according to N bits.

The quantization coefficient determiner 120 determines a quantization coefficient in the low frequency domain using Equation 2. The low frequency domain indicates the DC component of the transformed pixel values.

$$\begin{cases} QS = QP \times 2^{(N-8)} \times 2 & (QP < 3) \\ QS = 2^{(N-8)} \times 8 & (QP = 3 \text{ or } QP = 4) \\ QS = ([QP \times 2^{(N-8)}]/2) + 6 & (3 < QP < 4 \text{ or } QP > 4) \end{cases} \quad (2)$$

Here, QS denotes the quantization coefficient, QP denotes the quantization variable defined by the user, and N denotes the number of bits per pixel.

The quantization coefficient determiner 120 determines a quantization coefficient in the high frequency domain using Equation 3. The high frequency domain indicates the AC component of the transformed pixel values without the DC component.

$$QS = QP \times 2^{(N-8)} \times 2 \quad (3)$$

Here, QS denotes the quantization coefficient and QP denotes the quantization variable defined by the user.

The quantization unit 130 quantizes the pixel values transformed by the transformer 110 based on the quantization coefficient determined by the quantization coefficient determiner 120 and outputs the quantization result to the dequantization unit 140 and the entropy encoder 170.

The quantization unit 130 quantizes the pixel values using Equation 4 when quantizing the DC component or when performing uniform quantization of the AC component.

$$q = c/QS \quad (4)$$

Here, q denotes a quantized pixel value, c denotes a pixel value transformed by the transformer 110, and QS denotes the quantization coefficient.

The quantization unit 130 quantizes the pixel values transformed by the transformer 110 using Equation 5 when performing non-uniform quantization of the AC component.

$$q = (c + \{\text{sign}(c) \times QP \times 2^{(N-8)} \times r\})/QS \quad (5)$$

Here, q denotes a quantized pixel value, c denotes a pixel value transformed by the transformer 110, QS denotes the quantization coefficient, i.e., $QS = QP \times 2^{(N-8)} \times 2$, and $\{\text{sign}(c) \times QP \times 2^{(N-8)} \times r\}$ denotes an offset for the non-uniform quantization, wherein sign(c)=1 when c>0, sign(c)=0 when c=0, and sign(c)=−1 when c<0, and r is a constant within a range $0 \leq r \leq 1$.

The dequantization unit 140 dequantizes the pixel values quantized by the quantization unit 130 based on the quantization coefficient determined by the quantization coefficient determiner 120 and outputs the dequantization result to the detransformer 150.

The dequantization unit 140 dequantizes the quantized pixel values using Equation 6 when performing dequantization of the DC component or uniform dequantization of the AC component.

$$c' = q \times QS \quad (6)$$

Here, c' denotes a dequantized pixel value, q denotes a quantized pixel value, and QS denotes the quantization coefficient.

Meanwhile, the dequantization unit 140 dequantizes the quantized pixel values using Equation 7 when performing non-uniform dequantization of the AC component.

$$c' = q \times QS + \{\text{sign}(c) \times QP \times 2^{(N-8)}\} \quad (7)$$

Here, c' denotes a dequantized pixel value, q denotes a quantized pixel value, QS denotes the quantization coefficient, i.e., $QS = QP \times 2^{(N-8)} \times 2$, and $\{\text{sign}(c) \times QP \times 2^{(N-8)}\}$ denotes an offset for the non-uniform dequantization.

The detransformer 150 detransforms the pixel values dequantized by the dequantization unit 140 and outputs the detransformed result to the temporal prediction compensator 160.

The temporal prediction compensator 160 compensates for the detransformed pixel values of the pixel values predicted by the temporal predictor 100.

The entropy encoder 170 generates a bitstream of the pixel values quantized by the quantization unit 130.

An image data decoding apparatus according to an embodiment of the present invention will now be described in detail with reference to FIG. 2.

Figure 2:
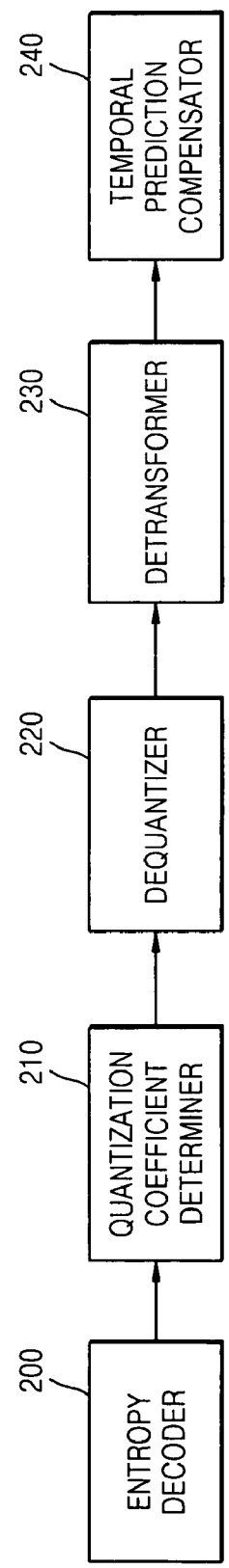
FIG. 2 is a block diagram of an image data decoding apparatus according to an embodiment of the present invention.

FIG. 2 is a block diagram of the image data decoding apparatus according to an embodiment of the present invention. Referring to FIG. 2, the image data decoding apparatus includes an entropy decoder 200, a quantization coefficient determiner 210, a dequantizer 220, a detransformer 230, and a temporal prediction compensator 240.

The entropy decoder 200 decodes a bitstream of pixel values of an image and outputs the decoding result to the quantization coefficient determiner 210.

The quantization coefficient determiner 210 determines a quantization coefficient proportional to the number of bits per pixel of the image and outputs the determination result to the dequantization unit 220.

The quantization coefficient determiner 210 determines a quantization coefficient in the low frequency domain using Equation 2. The quantization coefficient determiner 210 also determines a quantization coefficient in the high frequency domain using Equation 3.

The dequantizer 220 dequantizes the pixel values decoded by the entropy decoder 200 based on the quantization coefficient determined by the quantization coefficient determiner 210 and outputs the dequantization result to the detransformer 230.

The dequantization unit 220 dequantizes the pixel values decoded by the entropy decoder 200 using Equation 6 when performing dequantization of the DC component or uniform dequantization of the AC component.

In particular, the dequantization unit 220 dequantizes the pixel values decoded by the entropy decoder 200 using Equation 7 when performing non-uniform dequantization of the AC component.

The detransformer 230 detransforms the pixel values dequantized by the dequantization unit 220 and outputs the detransform result to the temporal prediction compensator 240.

The temporal prediction compensator 240 compensates for the temporally predicted pixel values of the pixel values detransformed by the detransformer 230.

An image data encoding method according to an embodiment of the present invention will now be described in detail with reference to FIG. 3.

FIG. 3 is a flowchart of the image data encoding method according to an embodiment of the present invention.

Referring to FIG. 3, in operation 300, pixel values of a current block are temporally predicted using a previous block in the time domain. A current image frame $F_n$ is predicted by estimating a motion in a previous image frame $F_{n-1}'$. That is, a block similar to a block having a predetermined size to be currently encoded is found in the previous frame $F_{n-1}'$, and then pixel values of the previous block is subtracted from pixel values of the current block.

In operation 302, the temporally predicted pixel values of an image are transformed into pixel values in the frequency domain. An orthogonal transform encoding method is used as the transforming method.

In operation 304, a quantization coefficient proportional to the number of bits per pixel of the image is determined. In particular, in operation 304, a quantization coefficient in the low frequency domain is determined using Equation 2. In addition, in operation 304, a quantization coefficient in the high frequency domain is determined using Equation 3.

In operation 306, the transformed pixel values are quantized based on the determined quantization coefficient. The pixel values are quantized using Equation 4 when quantization of the DC component or uniform quantization of the AC component is performed. In particular, in operation 306, the transformed pixel values are quantized using Equation 5 when non-uniform quantization of the AC component is performed.

In operation 308, a bitstream of the quantized pixel values is generated.

An image data decoding method according to an embodiment of the present invention will now be described in detail with reference to FIG. 4.

FIG. 4 is a flowchart of the image data decoding method according to an embodiment of the present invention.

Referring to FIG. 4, in operation 400, a bitstream of pixel values of an image is decoded.

In operation 402, a quantization coefficient is determined proportional to the number of bits per pixel of the image. In particular, in operation 402, a quantization coefficient in the low frequency domain is determined using Equation 2. In addition, in operation 402, a quantization coefficient in the high frequency domain is determined using Equation 3.

In operation 404, the decoded pixel values are dequantized based on the determined quantization coefficient. The quantized pixel values are dequantized using Equation 6 when dequantization of the DC component or uniform dequantization of the AC component is performed. In particular, in operation 404, the decoded pixel values are dequantized using Equation 7 when non-uniform dequantization of the AC component is performed.

In operation 406, the dequantized pixel values are detransformed.

In operation 408, the temporally predicted pixel values of the detransformed pixel values are compensated for.

Embodiments of the present invention can be written as code/instructions/computer programs and can be implemented in general-use digital computers that execute the code/instructions/computer programs using a computer readable recording medium. Examples of the computer readable recording medium include magnetic storage media (e.g., ROM, floppy disks, hard disks, etc.), optical recording media (e.g., CD-ROMs, or DVDs), and storage media. The computer readable recording medium can also be a distributed network of coupled computer systems so that the computer readable code is stored and executed in a distributed fashion.

In an apparatus and method for encoding and decoding image data according to the above-described embodiments of the present invention, by performing quantization automatically adaptive to the number of bits per pixel, a high quality image can be implemented at a high compression ratio.

In addition, adaptive encoding and decoding according to the number of bits per pixel can be performed by minimally changing the configuration of the conventional art (e.g., VC-1 standard technology).

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. An image data encoding apparatus comprising:
   a transformer including at least one processing device transforming pixel values of an image in a time domain into pixel values in a frequency domain;
   a quantization coefficient determiner determining a quantization coefficient proportional to a number of bits per pixel of the image, with the quantization coefficient being selectively different in a low frequency domain than in a high frequency domain based on a same quantization variable according to the determining;
   a quantization unit quantizing the pixel values transformed by the transformer based on the quantization coefficient determined by the quantization coefficient determiner; and
   an entropy encoder generating a bitstream of the quantized pixel values.

2. The image data encoding apparatus of claim 1, further comprising:
   a temporal predictor temporally predicting pixel values of a current block using a previous block in the time domain;
   a dequantization unit dequantizing the pixel values quantized by the quantization unit based on the quantization coefficient determined by the quantization coefficient determiner;
   a detransformer detransforming the pixel values dequantized by the dequantization unit; and
   a temporal prediction compensator compensating for the pixel values predicted by the temporal predictor.

3. The image data encoding apparatus of claim 2, wherein the dequantization unit dequantizes the quantized pixel values using the following equation when performing dequantization of a low frequency domain or uniform dequantization of a high frequency domain $$c' = q \times QS, \text{ and}$$

wherein c' is a dequantized pixel value, q is a quantized pixel value, and QS is the quantization coefficient.

4. The image data encoding apparatus of claim 2, wherein the dequantization unit dequantizes the quantized pixel values using the following equation when performing non-uniform dequantization of a high frequency domain $$c' = q \times QS + \{\text{sign}(c) \times QP \times 2^{(N-8)}\}, \text{ and}$$

wherein c' is a dequantized pixel value, q is a quantized pixel value, QS is the quantization coefficient, $\{\text{sign}(c) \times QP \times 2^{(N-8)}\}$ is an offset for the non-uniform dequantization.

5. The image data encoding apparatus of claim 1, wherein the quantization coefficient determiner determines a quantization coefficient in a low frequency domain using the following equation $$\begin{cases} QS = QP \times 2^{(N-8)} \times 2 & (QP < 3) \\ QS = 2^{(N-8)} \times 8 & (QP = 3 \text{ or } QP = 4) \\ QS = ([QP \times 2^{(N-8)}]/2) + 6 & (3 < QP < 4 \text{ or } QP > 4) \end{cases}, \text{ and}$$

wherein QS is the quantization coefficient, QP is a quantization variable defined by a user, and N is the number of bits per pixel.

6. The image data encoding apparatus of claim 1, wherein the quantization coefficient determiner determines a quantization coefficient in a high frequency domain using the following equation $$QS = QP \times 2^{(N-8)} \times 2, \text{ and}$$

wherein QS is the quantization coefficient and QP is a quantization variable defined by a user.

7. The image data encoding apparatus of claim 6, wherein the quantization unit quantizes the transformed pixel values using the following equation when performing quantization of a low frequency domain or uniform quantization of a high frequency domain $$q = c/QS, \text{ and}$$

wherein q is a quantized pixel value, c is a pixel value transformed by the transformer, and QS is the quantization coefficient.

8. The image data encoding apparatus of claim 6, wherein the quantization unit quantizes the transformed pixel values using the following equation when performing non-uniform quantization of a high frequency domain $$q = (c + \{\text{sign}(c) \times QP \times 2^{(N-8)} \times r\})/QS, \text{ and}$$

wherein q is a quantized pixel value, c is a pixel value transformed by the transformer, QS is the quantization coefficient, and $\{\text{sign}(c) \times QP \times 2^{(N-8)} \times r\}$ is an offset for the non-uniform quantization, wherein sign(c)=1 when c>0, sign(c)=0 when c=0, and sign(c)=−1 when c<0, and r is a constant within a range $0 \leq r \leq 1$.

9. An image data encoding apparatus comprising:
   a transformer including at least one processing device transforming pixel values of an image in a time domain into pixel values in a frequency domain;
   a quantization coefficient determiner determining a quantization coefficient proportional to a number of bits per pixel of the image;
   a quantization unit quantizing the pixel values transformed by the transformer based on the quantization coefficient determined by the quantization coefficient determiner; and
   an entropy encoder generating a bitstream of the quantized pixel values,
   wherein the quantization coefficient determiner determines a quantization coefficient in a low frequency domain using the following equation $$\begin{cases} QS = QP \times 2^{(N-8)} \times 2 & (QP < 3) \\ QS = 2^{(N-8)} \times 8 & (QP = 3 \text{ or } QP = 4) \\ QS = ([QP \times 2^{(N-8)}]/2) + 6 & (3 < QP < 4 \text{ or } QP > 4) \end{cases}, \text{ and}$$

wherein QS is the quantization coefficient, QP is a quantization variable defined by a user, and N is the number of bits per pixel.

10. An image data encoding apparatus comprising:
    a transformer including at least one processing device transforming pixel values of an image in a time domain into pixel values in a frequency domain;
    a quantization coefficient determiner determining a quantization coefficient proportional to a number of bits per pixel of the image;
    a quantization unit quantizing the pixel values transformed by the transformer based on the quantization coefficient determined by the quantization coefficient determiner; and an entropy encoder generating a bitstream of the quantized pixel values, wherein the quantization coefficient determiner determines a quantization coefficient in a high frequency domain using the following equation $$QS = QP \times 2^{(N-8)} \times 2, \text{ and}$$

wherein QS is the quantization coefficient and QP is a quantization variable defined by a user.

11. The image data encoding apparatus of claim 10, wherein the quantization unit quantizes the transformed pixel values using the following equation when performing quantization of a low frequency domain or uniform quantization of a high frequency domain $$q = c/QS, \text{ and}$$

wherein q is a quantized pixel value, c is a pixel value transformed by the transformer, and QS is the quantization coefficient.

12. The image data encoding apparatus of claim 10, wherein the quantization unit quantizes the transformed pixel values using the following equation when performing non-uniform quantization of a high frequency domain $$q = (c + \{\text{sign}(c) \times QP \times 2^{(N-8)} \times r\})/QS, \text{ and}$$

wherein q is a quantized pixel value, c is a pixel value transformed by the transformer, QS is the quantization coefficient, and $\{\text{sign}(c) \times QP \times 2^{(N-8)} \times r\}$ is an offset for the non-uniform quantization, wherein sign(c)=1 when c>0, sign(c)=0 when c=0, and sign(c)=−1 when c<0, and r is a constant within a range $0 \leq r \leq 1$.

13. An image data encoding apparatus comprising:
a transformer including at least one processing device transforming pixel values of an image in a time domain into pixel values in a frequency domain;
a quantization coefficient determiner determining a quantization coefficient proportional to a number of bits per pixel of the image;
a quantization unit quantizing the pixel values transformed by the transformer based on the quantization coefficient determined by the quantization coefficient determiner;
an entropy encoder generating a bitstream of the quantized pixel values;
a temporal predictor temporally predicting pixel values of a current block using a previous block in the time domain;
a dequantization unit dequantizing the pixel values quantized by the quantization unit based on the quantization coefficient determined by the quantization coefficient determiner;
a detransformer detransforming the pixel values dequantized by the dequantization unit; and
a temporal prediction compensator compensating for the pixel values predicted by the temporal predictor,
wherein the dequantization unit dequantizes the quantized pixel values using the following equation when performing non-uniform dequantization of a high frequency domain $$c' = q \times QS + \{\text{sign}(c) \times QP \times 2^{(N-8)}\}, \text{ and}$$

wherein c' is a dequantized pixel value, q is a quantized pixel value, QS is the quantization coefficient, $\{\text{sign}(c) \times QP \times 2^{(N-8)}\}$ is an offset for the non-uniform dequantization.

14. An image data decoding apparatus comprising:
an entropy decoder including at least one processing device decoding a bitstream of pixel values of an image;
a quantization coefficient determiner calculating a quantization coefficient proportional to a number of bits per pixel of the image from the bitstream, with the quantization coefficient being selectively different in a low frequency domain than in a high frequency domain based on a same quantization variable according to the determining;
a dequantization unit dequantizing the pixel values decoded by the entropy decoder based on the quantization coefficient calculated by the quantization coefficient determiner; and
a detransformer detransforming the dequantized pixel values having the number of bits per pixel.

15. The image data decoding apparatus of claim 14, wherein the quantization coefficient determiner calculates a quantization coefficient in a high frequency domain using the following equation $$QS = QP \times 2^{(N-8)} \times 2, \text{ and}$$

wherein QS is the quantization coefficient and QP is a quantization variable defined by a user.

16. The image data decoding apparatus of claim 14, wherein the dequantization unit dequantizes the quantized pixel values using the following equation when performing dequantization of a low frequency domain or uniform dequantization of a high frequency domain $$c' = q \times QS, \text{ and}$$

wherein c' is a dequantized pixel value, q is a quantized pixel value, and QS is the quantization coefficient.

17. The image data decoding apparatus of claim 14, further comprising a temporal prediction compensator compensating for the temporally predicted pixel values of the detransformed pixel values.

18. The image data decoding apparatus of claim 14, wherein the quantization coefficient determiner calculates a quantization coefficient in a low frequency domain using the following equation $$\begin{cases} QS = QP \times 2^{(N-8)} \times 2 & (QP < 3) \\ QS = 2^{(N-8)} \times 8 & (QP = 3 \text{ or } QP = 4) \\ QS = ([QP \times 2^{(N-8)}]/2) + 6 & (3 < QP < 4 \text{ or } QP > 4) \end{cases}, \text{ and}$$

wherein QS is the quantization coefficient, QP is a quantization variable defined by a user, and N is the number of bits per pixel.

19. The image data decoding apparatus of claim 14, wherein the dequantization unit dequantizes the quantized pixel values using the following equation when performing non-uniform dequantization of a high frequency domain $$c' = q \times QS + \{\text{sign}(c) \times QP \times 2^{(N-8)}\}, \text{ and}$$

wherein c' is a dequantized pixel value, q is a quantized pixel value, QS is the quantization coefficient, and $\{\text{sign}(c) \times QP \times 2^{(N-8)}\}$ is an offset for the non-uniform dequantization.

20. An image data decoding apparatus comprising:
an entropy decoder including at least one processing device decoding a bitstream of pixel values of an image;
a quantization coefficient determiner calculating a quantization coefficient proportional to a number of bits per pixel of the image from the bitstream;

a dequantization unit dequantizing the pixel values decoded by the entropy decoder based on the quantization coefficient calculated by the quantization coefficient determiner; and a detransformer detransforming the dequantized pixel values having the number of bits per pixel, wherein the quantization coefficient determiner calculates a quantization coefficient in a low frequency domain using the following equation $$\begin{cases} QS = QP \times 2^{(N-8)} \times 2 & (QP < 3) \\ QS = 2^{(N-8)} \times 8 & (QP = 3 \text{ or } QP = 4) \\ QS = ([QP \times 2^{(N-8)}]/2) + 6 & (3 < QP < 4 \text{ or } QP > 4) \end{cases}, \text{ and}$$

wherein QS is the quantization coefficient, QP is a quantization variable defined by a user, and N is the number of bits per pixel.

21. An image data decoding apparatus comprising:

an entropy decoder including at least one processing device decoding a bitstream of pixel values of an image;

a quantization coefficient determiner calculating a quantization coefficient proportional to a number of bits per pixel of the image from the bitstream;

a dequantization unit dequantizing the pixel values decoded by the entropy decoder based on the quantization coefficient calculated by the quantization coefficient determiner; and a detransformer detransforming the dequantized pixel values having the number of bits per pixel, wherein the dequantization unit dequantizes the quantized pixel values using the following equation when performing non-uniform dequantization of a high frequency domain $$c' = q \times QS + \{\text{sign}(c) \times QP \times 2^{(N-8)}\}, \text{ and}$$

wherein c' is a dequantized pixel value, q is a quantized pixel value, QS is the quantization coefficient, and $\{\text{sign}(c) \times QP \times 2^{(N-8)}\}$ is an offset for the non-uniform dequantization.

22. An image data encoding method comprising:

transforming, using at least one processing device, pixel values of an image in a time domain into pixel values in a frequency domain;

determining a quantization coefficient proportional to the number of bits per pixel of the image, with the quantization coefficient being selectively different in a low frequency domain than in a high frequency domain based on a same quantization variable according to the determining;

quantizing the transformed pixel values based on the determined quantization coefficient; and generating a bitstream of the quantized pixel values.

23. The image data encoding method of claim 22, wherein, in the determination of the quantization coefficient, a quantization coefficient in a high frequency domain is determined using the following equation $$QS = QP \times 2^{(N-8)} \times 2, \text{ and}$$

wherein QS is the quantization coefficient and QP is a quantization variable defined by a user.

24. The image data encoding method of claim 23, wherein, in the quantization, when non-uniform quantization of a high frequency domain is performed, the transformed pixel values are quantized using the following equation $$q = (c + \{\text{sign}(c) \times QP \times 2^{(N-8)} \times r\})/QS, \text{ and}$$

wherein q is a quantized pixel value, c is a pixel value transformed by the transformer, QS is the quantization coefficient, and $\{\text{sign}(c) \times QP \times 2^{(N-8)} \times r\}$ is an offset for the non-uniform quantization, wherein $\text{sign}(c) = 1$ when $c > 0$, $\text{sign}(c) = 0$ when $c = 0$, and $\text{sign}(c) = -1$ when $c < 0$, and r is a constant within a range $0 \leq r \leq 1$.

25. The image data encoding method of claim 22, wherein, in the quantization, when quantization of a low frequency domain or uniform quantization of a high frequency domain is performed, the transformed pixel values are quantized using the following equation $$q = c/QS, \text{ and}$$

wherein q is a quantized pixel value, c is a pixel value transformed by the transformer, and QS is the quantization coefficient.

26. The image data encoding method of claim 22, further comprising temporally predicting pixel values of a current block using a previous block in the time domain and proceeding to the transforming.

27. The image data encoding method of claim 22, wherein, in the determination of the quantization coefficient, a quantization coefficient in a low frequency domain is determined using the following equation $$\begin{cases} QS = QP \times 2^{(N-8)} \times 2 & (QP < 3) \\ QS = 2^{(N-8)} \times 8 & (QP = 3 \text{ or } QP = 4) \\ QS = ([QP \times 2^{(N-8)}]/2) + 6 & (3 < QP < 4 \text{ or } QP > 4) \end{cases}, \text{ and}$$

wherein QS is the quantization coefficient, QP is a quantization variable defined by a user, and N is the number of bits per pixel.

28. An image data encoding method comprising:

transforming, using at least one processing device, pixel values of an image in a time domain into pixel values in a frequency domain;

determining a quantization coefficient proportional to the number of bits per pixel of the image;

quantizing the transformed pixel values based on the determined quantization coefficient; and generating a bitstream of the quantized pixel values, wherein, in the determination of the quantization coefficient, a quantization coefficient in a low frequency domain is determined using the following equation $$\begin{cases} QS = QP \times 2^{(N-8)} \times 2 & (QP < 3) \\ QS = 2^{(N-8)} \times 8 & (QP = 3 \text{ or } QP = 4) \\ QS = ([QP \times 2^{(N-8)}]/2) + 6 & (3 < QP < 4 \text{ or } QP > 4) \end{cases}, \text{ and}$$

wherein QS is the quantization coefficient, QP is a quantization variable defined by a user, and N is the number of bits per pixel.

29. An image data encoding method comprising:

transforming, using at least one processing device, pixel values of an image in a time domain into pixel values in a frequency domain;

determining a quantization coefficient proportional to the number of bits per pixel of the image;

quantizing the transformed pixel values based on the determined quantization coefficient; and generating a bitstream of the quantized pixel values, wherein, in the determination of the quantization coefficient, a quantization coefficient in a high frequency domain is determined using the following equation $$QS = QP \times 2^{(N-8)} \times 2, \text{ and}$$

wherein QS is the quantization coefficient and QP is a quantization variable defined by a user, and wherein, in the quantization, when non-uniform quantization of a high frequency domain is performed, the transformed pixel values are quantized using the following equation $$q=(c+\{\text{sign}(c) \times QP \times 2^{(N-8)} \times r\})/QS, \text{ and}$$

wherein q is a quantized pixel value, c is a pixel value transformed by the transformer, QS is the quantization coefficient, and $\{\text{sign}(c) \times QP \times 2^{(N-8)} \times r\}$ is an offset for the non-uniform quantization, wherein sign(c)=1 when c>0, sign(c)=0 when c=0, and sign(c)=−1 when c<0, and r is a constant within a range $0 \leq r \leq 1$.

30. An image data decoding method comprising:
decoding, using at least one processing device, a bitstream of pixel values of an image;
calculating a quantization coefficient proportional to a number of bits per pixel of the image from the bitstream, with the quantization coefficient being selectively different in a low frequency domain than in a high frequency domain based on a same quantization variable according to the determining;
dequantizing the decoded pixel values based on the calculated quantization coefficient; and
detransforming the dequantized pixel values having the number of bits per pixel.

31. The image data decoding method of claim 30, wherein, in the calculation of the quantization coefficient, a quantization coefficient in a high frequency domain is calculated using the following equation $$QS = QP \times 2^{(N-8)} \times 2, \text{ and}$$

wherein QS is the quantization coefficient and QP is a quantization variable defined by a user.

32. The image data decoding method of claim 30, wherein, in the dequantization, when dequantization of a low frequency domain or uniform dequantization of a high frequency domain is performed, the quantized pixel values are dequantized using the following equation $$c' = q \times QS, \text{ and}$$

wherein c' is a dequantized pixel value, q is a quantized pixel value, and QS is the quantization coefficient.

33. The image data decoding method of claim 30, further comprising after the detransforming, compensating for the temporally predicted pixel values of the detransformed pixel values.

34. The image data decoding method of claim 30, wherein, in the calculation of the quantization coefficient, a quantization coefficient in a low frequency domain is calculated using the following equation $$\begin{cases} QS = QP \times 2^{(N-8)} \times 2 & (QP < 3) \\ QS = 2^{(N-8)} \times 8 & (QP = 3 \text{ or } QP = 4) \\ QS = ([QP \times 2^{(N-8)}]/2) + 6 & (3 < QP < 4 \text{ or } QP > 4) \end{cases}, \text{ and}$$

wherein QS is the quantization coefficient, QP is a quantization variable defined by a user, and N is the number of bits per pixel.

35. The image data decoding method of claim 30, wherein, in the dequantization, when non-uniform dequantization of a high frequency domain is performed, the quantized pixel values are dequantized using the following equation $$c' = q \times QS + \{\text{sign}(c) \times QP \times 2^{(N-8)}\}, \text{ and}$$

wherein c' is a dequantized pixel value, q is a quantized pixel value, QS is the quantization coefficient, and $\{\text{sign}(c) \times QP \times 2^{(N-8)}\}$ is an offset for the non-uniform dequantization.

36. An image data decoding method comprising:
decoding, using at least one processing device, a bitstream of pixel values of an image;
calculating a quantization coefficient proportional to a number of bits per pixel of the image from the bistream;
dequantizing the decoded pixel values based on the calculated quantization coefficient; and
detransforming the dequantized pixel values having the number of bits per pixel,
wherein, in the calculation of the quantization coefficient, a quantization coefficient in a low frequency domain is calculated using the following equation $$\begin{cases} QS = QP \times 2^{(N-8)} \times 2 & (QP < 3) \\ QS = 2^{(N-8)} \times 8 & (QP = 3 \text{ or } QP = 4) \\ QS = ([QP \times 2^{(N-8)}]/2) + 6 & (3 < QP < 4 \text{ or } QP > 4) \end{cases}, \text{ and}$$

wherein QS is the quantization coefficient, QP is a quantization variable defined by a user, and N is the number of bits per pixel.

37. An image data decoding method comprising:
decoding, using at least one processing device, a bitstream of pixel values of an image;
calculating a quantization coefficient proportional to a number of bits per pixel of the image from the bistream;
dequantizing the decoded pixel values based on the calculated quantization coefficient; and
detransforming the dequantized pixel values having the number of bits per pixel,
wherein, in the dequantization, when non-uniform dequantization of a high frequency domain is performed, the quantized pixel values are dequantized using the following equation $$c' = q \times QS + \{\text{sign}(c) \times QP \times 2^{(N-8)}\}, \text{ and}$$

wherein c' is a dequantized pixel value, q is a quantized pixel value, QS is the quantization coefficient, and $\{\text{sign}(c) \times QP \times 2^{(N-8)}\}$ is an offset for the non-uniform dequantization.

38. An image data decoding method comprising:
decoding, using at least one processing device, a bitstream of pixel values of an image;
determining a quantization coefficient proportional to a number of bits per pixel of the image, with the quantization coefficient being selectively different in a low frequency domain than in a high frequency domain based on a same quantization variable according to the determining;
dequantizing the decoded pixel values based on the determined quantization coefficient; and
detransforming the dequantized pixel values,
wherein the bitstream is an encoder generated bitstream, the encoder transforming to-be-encoded pixel values of a to-be-encoded image in a time domain into to-be-encoded pixel values in a frequency domain, quantizing the transformed pixel values with a quantization coefficient equal to the determined quantization coefficient, and generating the encoder generated bitstream of the quantized pixel values.

39. A non-transitory computer readable recording medium storing a computer readable program to control at least one processing device to implement the method of claim 22.

40. A non-transitory computer readable recording medium storing a computer readable program to control at least one processing device to implement the method of claim 30.

* * * * *

UNITED STATES PATENT AND TRADEMARK OFFICE
CERTIFICATE OF CORRECTION

PATENT NO. : 7,995,847 B2
APPLICATION NO. : 11/482036
DATED : August 9, 2011
INVENTOR(S) : Wooshik Kim et al.

It is certified that error appears in the above-identified patent and that said Letters Patent is hereby corrected as shown below:

Column 14, Line 5, In Claim 36, delete "bistream;" and insert --bitstream;--, therefor.

Column 14, Line 27 (Approx.), In Claim 37, delete "bistream;" and insert --bitstream;--, therefor.

Column 14, Line 54-55, In Claim 38, delete "to-be encoded" and insert --to-be-encoded--, therefor.

Signed and Sealed this
Third Day of January, 2012

David J. Kappos
*Director of the United States Patent and Trademark Office*